Oct. 16, 1923.
E. L. SCHUMACHER
OPHTHALMIC MOUNTING
Filed April 10, 1922
1,471,009
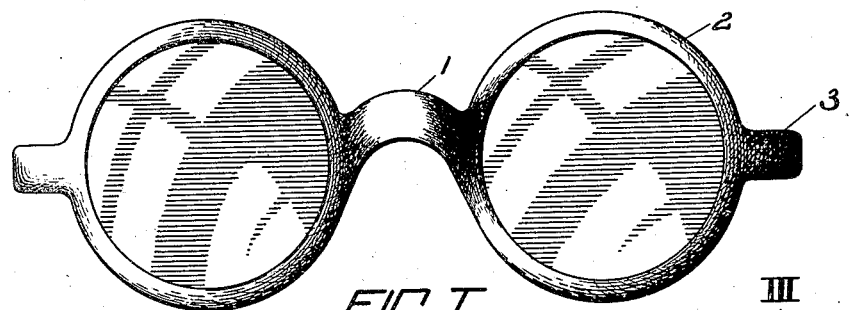
FIG. I
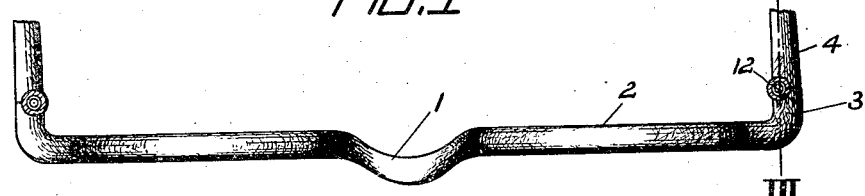
FIG. II
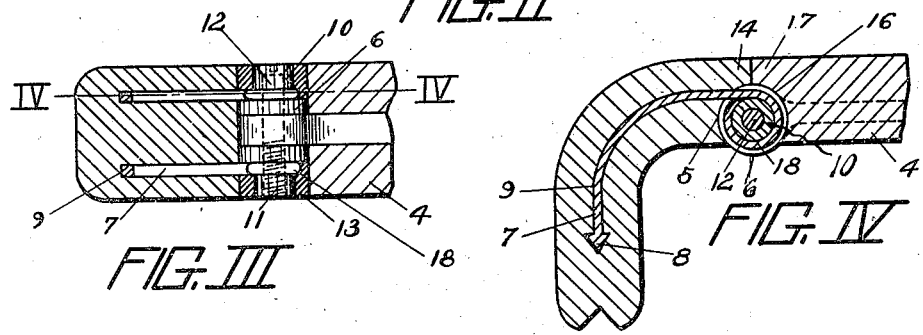
FIG. III
FIG. IV
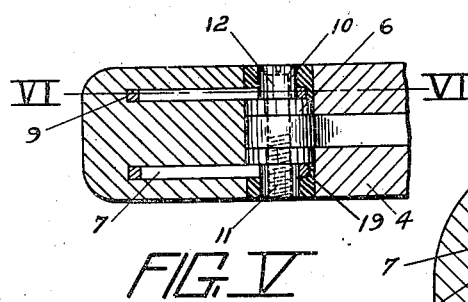
FIG. V
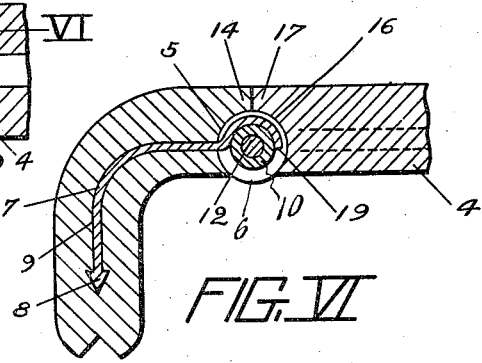
FIG. VI
INVENTOR
ELMER L. SCHUMACHER
BY
H. H. Styll & A. H. Parsons
ATTORNEYS Patented Oct. 16, 1923.

1,471,009

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed April 10, 1922. Serial No. 551,233.

*To all whom it may concern:*

Be it known that I, ELMER L. SCHUMACHER, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to an improved type of mounting constructed from non-metallic material.

One of the main objects of the present invention is the provision of a novel and improved construction of temple or other joint for non-metallic frames which will insure secure holding of the parts and wherein the exposure of the metal parts of the joint is reduced to a minimum.

A further object of the invention is the provision of ophthalmic mounting constructed from non-metallic material wherein the end portions of the eye wire are formed continuously and extended laterally and rearwardly and within suitable re-inforcement is embedded within these laterally and rearwardly extended portions to retain them in their proper shape under various atmospheric conditions and also from becoming distorted and presenting an unsightly appearance.

With the above and other objects in view the invention consists in the novel features of construction, the combination and arrangement of parts, hereinafter more fully set forth, pointed out in the claims as shown in the accompanying drawings in which, Figure I is a front elevation of a mounting embodying my improvements.

Figure II is a plan view thereof.

Figure III is a longitudinal sectional view taken on the line III—III of Figure II.

Figure IV is a horizontal section taken on the line IV—IV of Figure III.

Figure V is a longitudinal sectional view of a modified form of hinge joint between the temple and frame.

Figure VI is a horizontal section taken on the line VI—VI of Figure V.

Referring now more particularly to drawings in which the similar characters refer to corresponding parts thruout the several views, the numeral 1 indicates the bridge or center of a spectacle frame or mounting having the lens receiving or eye wire portions 2 formed from suitable composition or non-metallic material. these eye wires terminating in the end piece portions 3 preferably continuous as indicated.

In the formation of frames of this type previous to my invention it has been customary to extend the end piece portions 3 laterally from the eye wires and then to secure the temple pieces to these laterally extended portions. This construction has detracted materially from the appearance of the frame and has so weakened the joint that it is liable to bend or get out of shape under ordinary wearing conditions permitting the temples to become loosened at their connection with the eye wires.

I have endeavored to not only overcome these difficulties but at the same time provide a connection between the extended end portions and the temples wherein the exposure of the metal parts of the joint is reduced to a minimum and at the same time insure secure holding of the parts. In order to provide for a proper hinge connection between the temple members 4 and the end portions 3 each of the end portions is provided within one corner, with an arcuate recess 5 and arranged within this recess are the bearing plates 6 fitted within the recess 5 and retained in position by means of the re-inforcing rods or wires 7. These rods or re-inforcing wires 7 extend thruout the length of the end portions 3 and are preferably provided at their inner ends with spur members 8 whereby to retain the said rods or wires in their relative positions which in turn will retain the bearing plate 6 in position. In order to insert the rods or wires within the material of the end portions, the end portions can be drilled, the drill extending thru the end portions toward the lens receiving groove of the eye wire. The spur member 8 formed upon the end of each of the re-inforcing rod 7 is of a size that it may be readily forced into the opening 9 toward the lens receiving grooves. As illustrated in the drawings the plates 6 are arranged upon opposite sides of the transverse center of the end portions and formed upon one face of each of the plates 6 is a sleeve 10, the outer end of said sleeve being flush with the side portions of the end pieces 3.

The sleeves 10 are to be of a proper size, one of said sleeves being interiorly threaded as at 11 to receive the pivot pin 12. In order to provide for a neat appearance upon the exterior of the mounting, non-metallic bushings are fitted within the recess 5 and provided with central openings to receive the sleeves 10. These composition or non-metallic bushings 13 are pressed in position upon the bearing plates and cemented or otherwise secured to the end pieces 3 so as to form a substantial continuation of the end pieces and at the same time seclude a comparatively large portion of the metallic parts.

I wish to call attention to the manner in which the joint is mounted within the ends of the members 3 whereby the portion 14 is extended over the outer face of the joint so that metal parts of the joint will not be exposed upon the exterior of the mounting.

The improved temple members comprise the non-metallic exterior having a metal butt or eye portion attached to the end of the side portion of each of the temples, this butt or eye portion being preferably flat and perforated so that the same can be readily inserted in between the two bearing plates 6 and pivotally connected to the end pieces 3 by means of the pivot pin 12. Attention is called to the fact that the inner end of each temple 4 is provided with a recess 16 which co-operates with the recess 5 in each of the end pieces 3 whereby to embrace the joint between the temple and end pieces. By forming the recess 16, it provides for the extension 17 which abuts against the end of the projection 14 when the temples are in an open position or disposed in alignment with the rearwardly turned ends of the end pieces whereby to exclude from view the joint between the temple and end pieces so that none of the metallic parts of the joint will be exposed to view on the exterior of the mounting.

I wish to call attention to the various ways in which the rods or re-inforcing wires 7 may be connected to the bearing members arranged upon opposite sides of the temple plate wherein the inner end of the wire 7, as illustrated in Figure 4, extends around or embraces the sleeve 10 and is then extended into the drilled opening 9. After the rod or re-inforcing wire 7 has been inserted within the drilled openings 9 the frame is then put into suitable dies or forming members, the frame being preferably partially heated so that the end pieces 3 can be readily bent rearwardly as shown in Figure 2, this shaping also bends the wire or rod 7 which will fit in the new position and tend to securely hold the end pieces in rearwardly bent position and eliminate the possibility of resuming their normal shape due to atmospheric conditions or when placed in hot water. By coiling one end of the rod or wire about the sleeve 10 this construction will not only retain the plates 6 in their proper relative positions but will prevent any longitudinal movement on the part of the wires or rods and at the same time eliminate any lateral movement.

In Figures V and VI I have illustrated a slightly modified form of the invention wherein the inner ends of the rods or wires which form a re-inforcement for the end pieces are extended around a portion of the edge of the bearing plate 6 as illustrated at 19. The wire or rod after being secured to the edge of the bearing 6 is extended into the drilled opening 9 and the material is then swaged, struck or pressed, in order to securely press it against the spur member 8 to insure against relative play of the parts so that the parts will be jointed in a unitary structure. It will also be apparent that after the bearing members have been placed in position, the bushings 13 are then positioned over the sleeves 10 and cemented or otherwise secured to the arcuate face of the recess 5 so as to exclude from view the majority of the metallic parts.

Claims:

1. A mounting of the character described including a rearwardly extending composition end piece, spaced bearing members, non-metallic bushings embracing portions of said bearing members for supporting the same at the end of the end pieces and a composition temple having a shoulder engaging the end piece and having a projecting eye pivotally arranged between said bearing members.

2. A mounting of the character described including a rearwardly extending composition end piece, spaced bearing members at the end of said end piece, a sleeve between said bearing members, re-inforcing rod having one end embracing the sleeve and extending into the end piece and a bushing carried by each of said bearings and secured to the end piece as and for the purpose set forth.

3. A mounting of the character described including rearwardly extending composition end pieces, spaced bearings at the ends of each end piece, re-inforcing members embracing portions of the bearings and extending into the end pieces and bushings embracing the bearings and connected to the ends of the end pieces.

4. A mounting of the character described including rearwardly extending composition end pieces, spaced bearings at the ends of each end piece and bushings embracing the bearings and connected to the end pieces as and for the purpose set forth.

ELMER L. SCHUMACHER.